(12) United States Patent
Studer et al.

(10) Patent No.: US 7,675,631 B2
(45) Date of Patent: Mar. 9, 2010

(54) HOLOGRAPHIC OPTICAL ELEMENT

(75) Inventors: Urs-Peter Studer, Riehen (CH); Beda Kaeser, Brügg (CH)

(73) Assignee: Zumbach Electronic AG, Orpund (CH)

( * ) Notice: Subject to any disclaimer, the term of this patent is extended or adjusted under 35 U.S.C. 154(b) by 55 days.

(21) Appl. No.: 12/005,309

(22) Filed: Dec. 27, 2007

(65) Prior Publication Data

US 2008/0186502 A1 Aug. 7, 2008

Related U.S. Application Data

(63) Continuation of application No. 10/726,543, filed on Dec. 4, 2003, now abandoned.

(30) Foreign Application Priority Data

Dec. 9, 2002 (EP) .................................. 02027560

(51) Int. Cl.
*G01N 21/00* (2006.01)

(52) U.S. Cl. ................... 356/614; 356/607; 356/608; 356/625

(58) Field of Classification Search ......... 356/603–610, 356/621–622, 639, 328–334, 152, 3.6; 359/15, 359/12, 19, 32, 35, 326, 356, 373; 430/5
See application file for complete search history.

(56) References Cited

U.S. PATENT DOCUMENTS

| | | | |
|---|---|---|---|
| 4,245,882 A | 1/1981 | Chang | |
| 4,312,559 A | 1/1982 | Kojima et al. | |
| 4,432,597 A | 2/1984 | Bjorklund et al. | |
| 4,455,061 A | 6/1984 | Case | |
| 4,547,037 A * | 10/1985 | Case | 359/15 |
| 4,603,938 A * | 8/1986 | Kojima et al. | 359/19 |
| 4,878,718 A | 11/1989 | Gilbreath-Frandsen et al. | |
| 4,930,847 A | 6/1990 | Cederquist | |
| 4,955,694 A | 9/1990 | Kaser | |
| 4,960,311 A * | 10/1990 | Moss et al. | 359/9 |
| 5,009,502 A | 4/1991 | Shih et al. | |
| 5,018,803 A | 5/1991 | Hecker et al. | |
| 5,117,296 A | 5/1992 | Hoebing | |
| 5,121,371 A | 6/1992 | Farnsworth et al. | |
| 5,124,815 A | 6/1992 | Chang | |
| 5,383,022 A | 1/1995 | Kaser | |
| 5,422,746 A * | 6/1995 | Aharoni et al. | 359/16 |
| 5,930,734 A | 7/1999 | Hofmann et al. | |
| 7,099,057 B2 * | 8/2006 | Parker et al. | 359/15 |

FOREIGN PATENT DOCUMENTS

EP 0 245 198 11/1987

* cited by examiner

*Primary Examiner*—Sang Nguyen
(74) *Attorney, Agent, or Firm*—Venable LLP; Robert Kinberg; Steven J. Schwarz

(57) ABSTRACT

A method of measuring a dimension and/or position of an object located in a measuring field, includes projecting a fan-shaped reference wave onto a holographic optical element having a first interference pattern and a second interference pattern; forming a first parallel partial wave front from the fan-shaped reference wave using the first interference pattern, the first parallel partial wave front entering the measuring field; and forming a second parallel partial wave front from the fan-shaped reference wave using the second interference pattern, the second parallel partial wave front entering the measuring field; wherein the measuring field is located behind the holographic optical element, and the first parallel partial wave front and the second parallel partial wave front intersect in the measuring field. A method of making a holographic optical element is also disclosed.

21 Claims, 6 Drawing Sheets

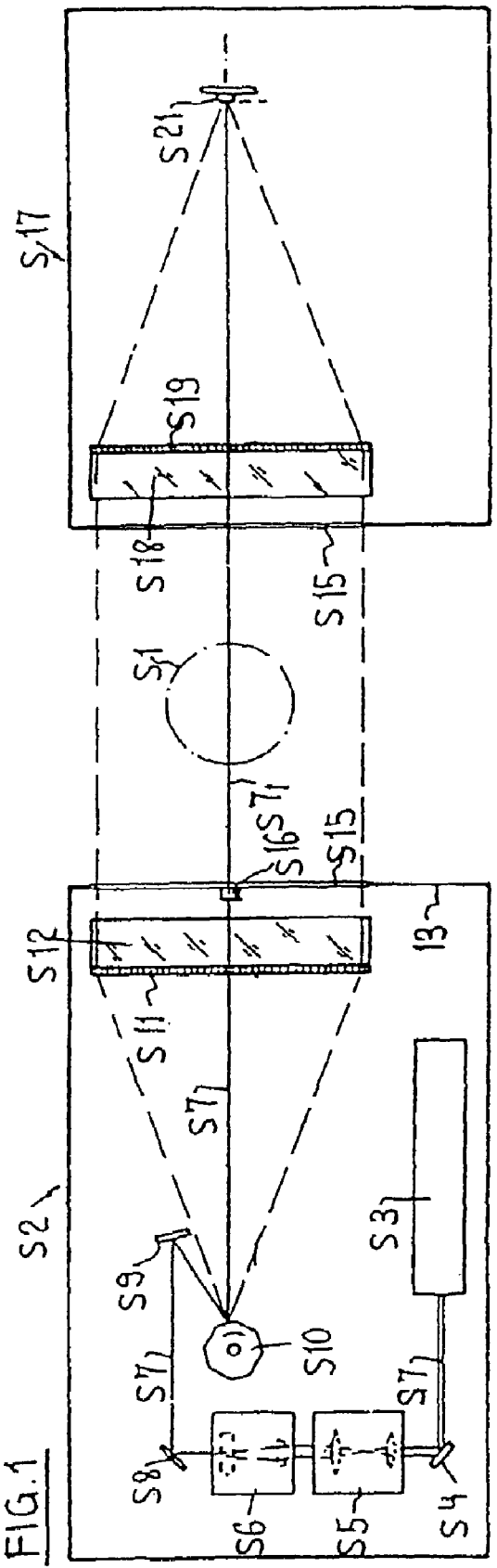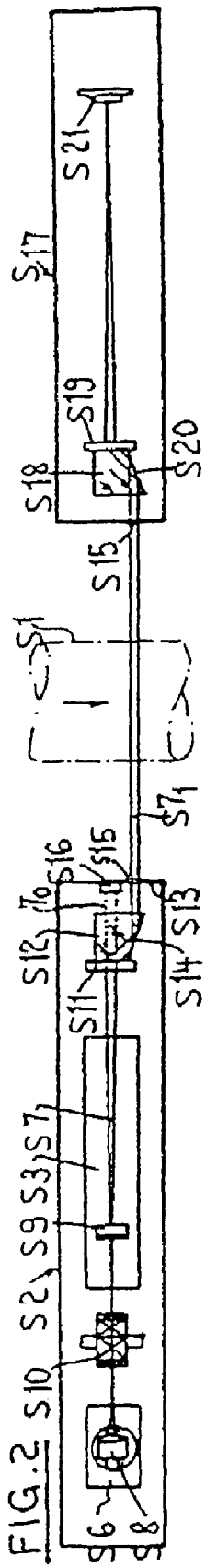
PRIOR ART

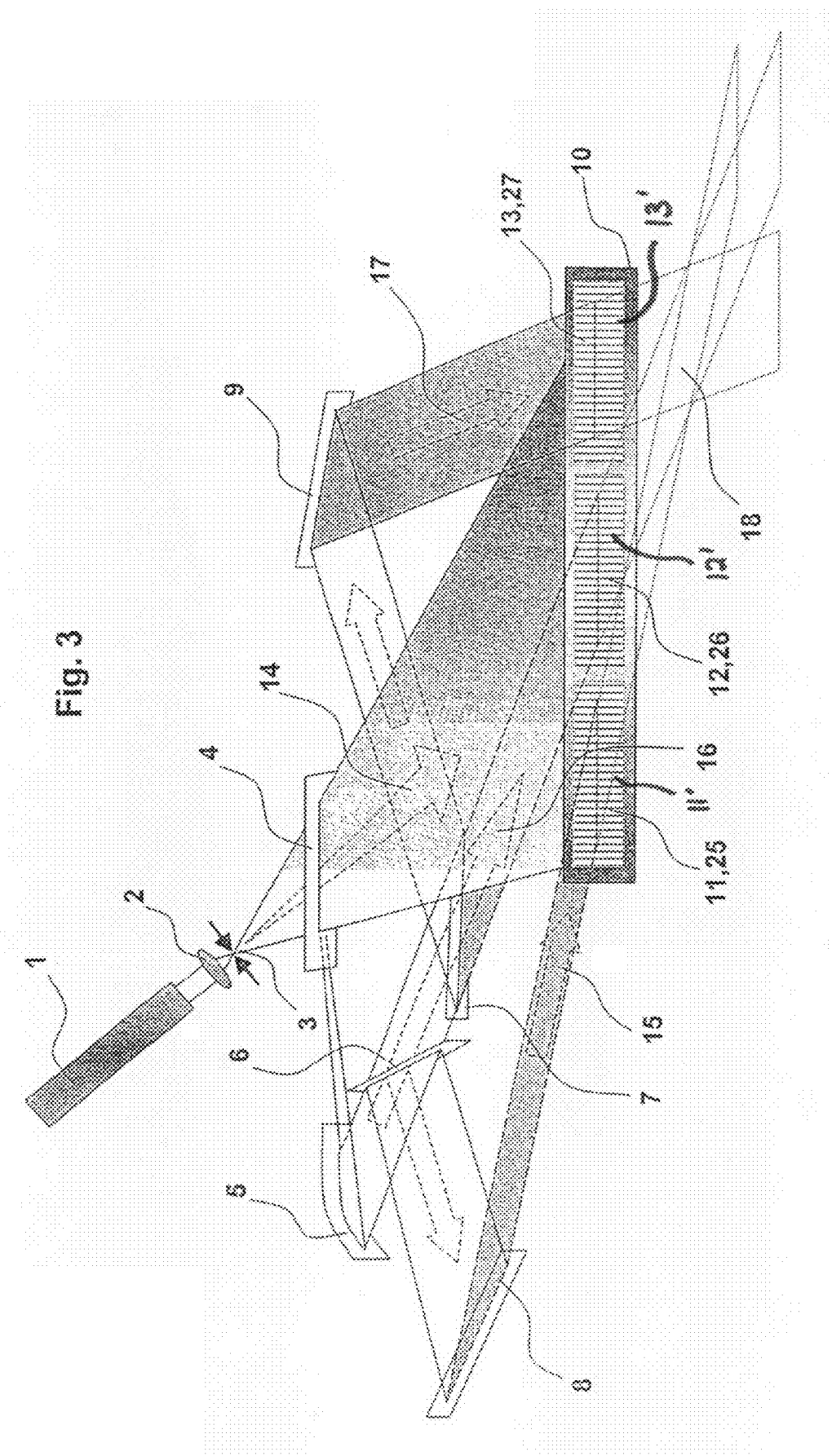

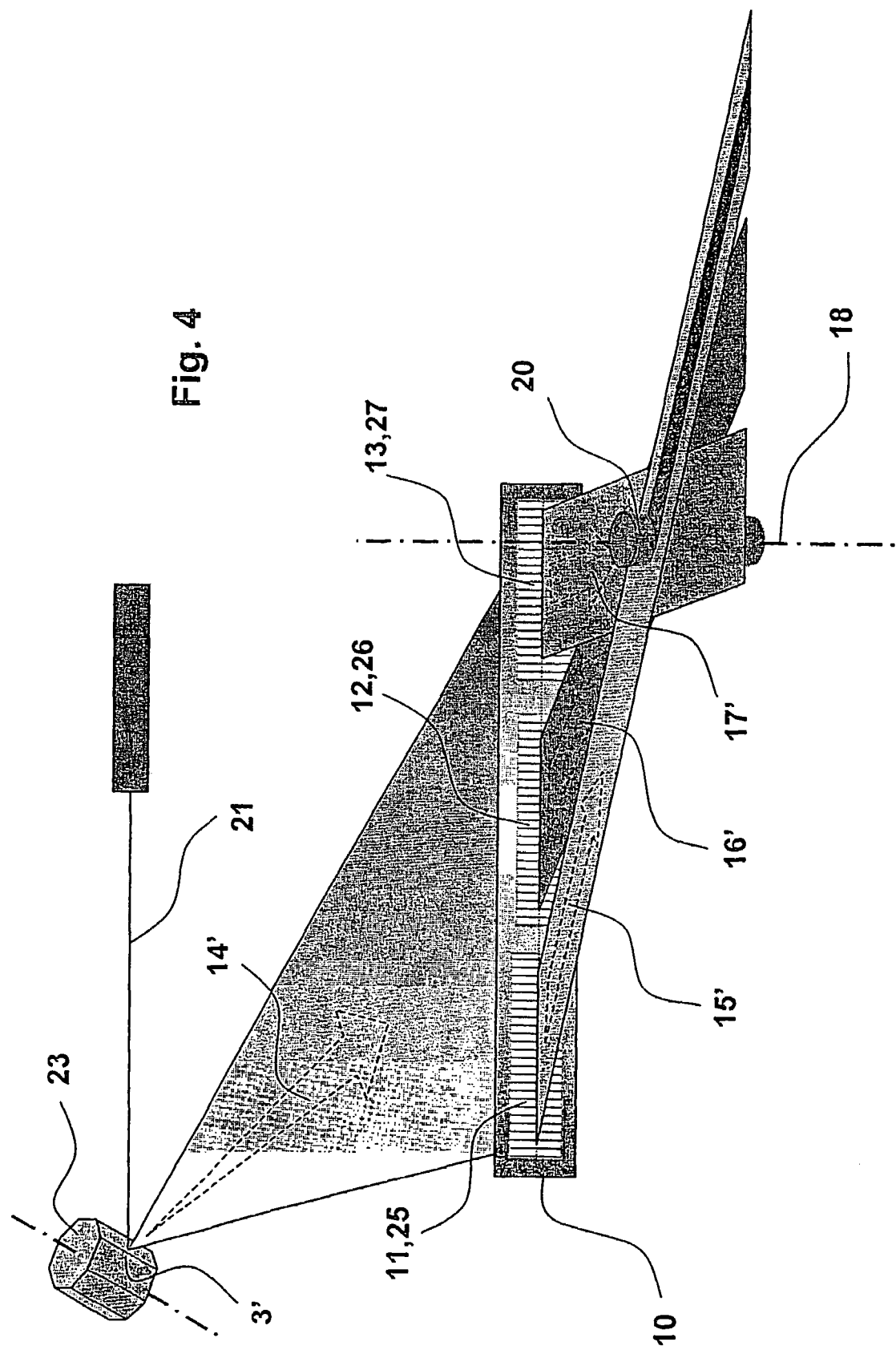

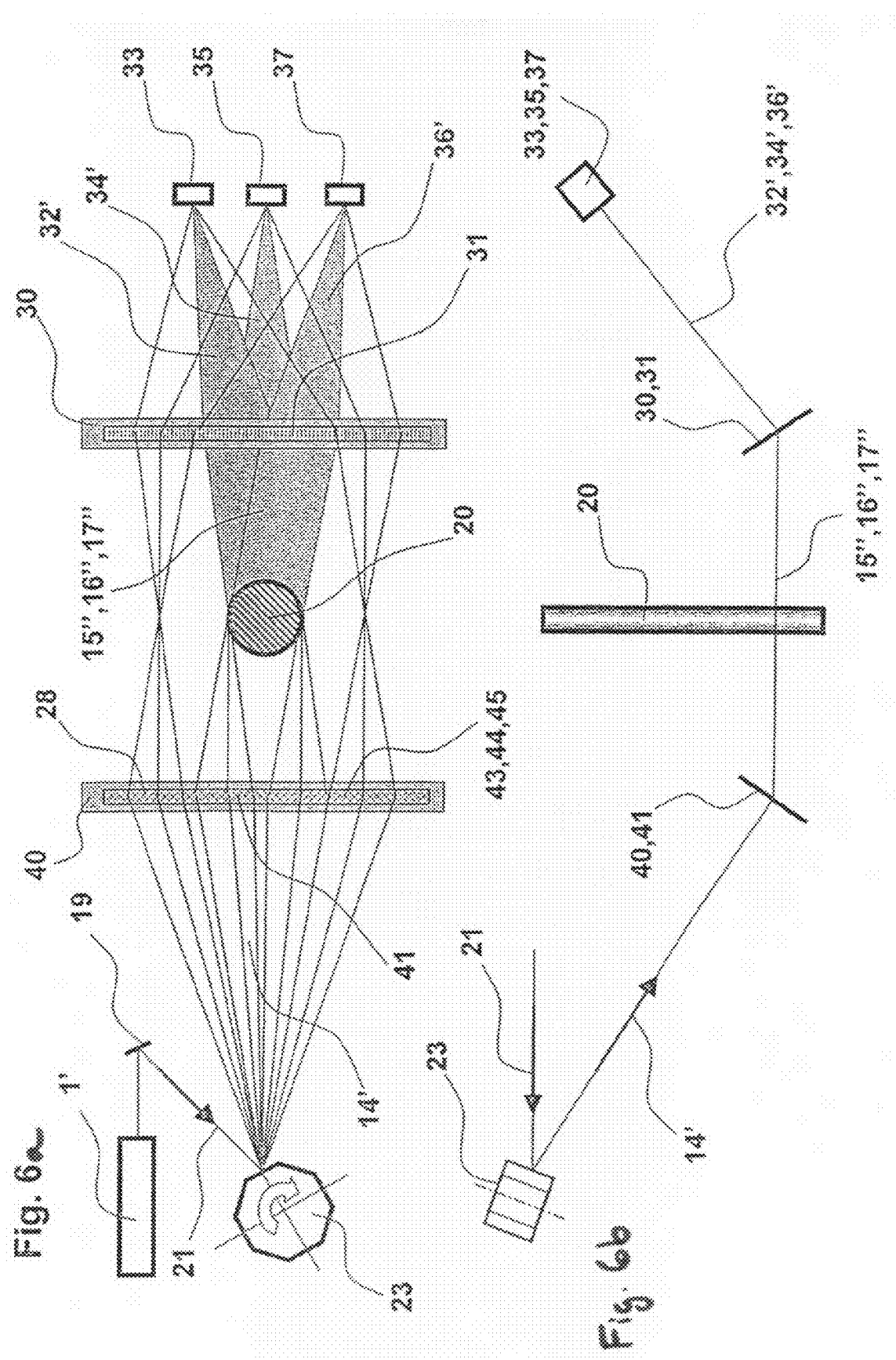

HOLOGRAPHIC OPTICAL ELEMENT

CROSS-REFERENCE TO RELATED APPLICATION

This application is a continuation of U.S. application Ser. No. 10/726,543, filed on Dec. 4, 2003, which claims the priority of European Patent Application No. 02027560.8, filed on Dec. 9, 2002. The subject matter of both of the foregoing applications is expressly incorporated herein by reference.

BACKGROUND OF THE INVENTION

The present invention relates to a holographic optical element for measuring the dimension and position of an object with the aid of a deflected light beam that sweeps across a specific angular range, the element having an interference pattern in one section which can be created in a manner known per se through simultaneous exposure to a fan-shaped reference wave front, generated by a monochromatic and coherent laser light source, and a parallel wave front that is also generated by the same monochromatic, coherent laser light source, but hits the element at a different angle than the reference wave front, as well as through the subsequent development.

For the purpose of this document, a holographic optical element of this type is henceforth referred to as an HOE.

A special holographic laboratory is generally required in order to produce an HOE. The equipment by and large corresponds to that of a photo laboratory, with the exception that only monochromatic, coherent laser light is used. Film plates (coated glass plates) are used to produce holograms and, in particular an HOE. These plates are exposed to selected wave fronts and are subsequently developed, depending on the film base that is used.

An HOE of this type is described, among other things, in European Patent Application No. EP-A 0 245 198. This reference also contains detailed instructions for producing an HOE used in a device and with a method for generating light beams for measuring the dimension and/or position of an object in the deflection displacement region of this light beam.

If the HOE, produced as described in the above, is exposed to a suitable laser reference wave front, then the other wave front used during the picture taking is correspondingly reconstructed.

With the above-mentioned device, the object to be measured, in particular a cable or the like, can be measured only in one direction.

SUMMARY OF THE INVENTION

It is an object of the present invention to provide a holographic optical element which can be used to determine several parameters of the object to be measured.

The above and other objects are accomplished according to the invention by the provision of a holographic optical element for measuring at least one of the dimension and position of an object with aid of a deflected laser beam generated by a monochromatic and coherent laser light source that sweeps across an angular range to produce a fan-shaped reference wave front, the element comprising: at least two interference patterns, wherein each interference pattern is created through simultaneous exposure of the element to the fan-shaped reference wave front generated by the monochromatic and coherent laser light source and a parallel partial wave front generated by the same monochromatic and coherent laser light source and hitting the element at a different angle than the reference wave front, wherein the number of parallel partial wave fronts used for the exposure of the element corresponds to the number of interference patterns, and wherein if the parallel partial wave fronts are virtually extended through the holographic optical element, they intersect behind the element in a center of a measuring field.

The HOE according to the invention thus comprises at least two different interference patterns which are present in a specific region of the HOE. According to the invention, the interference patterns may be allocated respectively to spatially separate sections, or may at least partially overlap one another in one section. The type and design of these sections will be explained in further detail in the following.

To produce the HOE according to our invention, the number of partial wave fronts used during the exposure corresponds to the number of interference patterns. The partial wave fronts are generated by the same laser light source and their course is such that when virtually extended through the holographic optical element, they intersect in one point and/or one region behind the element.

According to one preferred embodiment, the HOE according to the invention has 3 or more (meaning 4, 5, 6, . . . ) interference patterns.

If the HOE created in this way is exposed to a suitable laser reference wave front, then the other wave fronts used during the picture taking are correspondingly reconstructed. Thus, with a suitable selection and arrangement it is possible to generate an almost optional number of wave fronts with a defined reference wave front.

In contrast to conventional optical elements, for example lenses, prisms and mirrors, which can reproduce only a single image through refraction or reflection of light, the HOE is based on the diffraction principle, thus making it possible to generate several independent images with a suitable film structure. A precondition for this, however, is the use of monochromatic laser light which should have the same wave length as the wave length for the laser light used during the picture taking.

The HOE according to our invention makes it possible to measure the object to be measured in a device in several directions and thus be able to determine not only the thickness in one direction when measuring cables, for example, as is the case with the known device. By making it possible to take measurements in several directions, it is also possible to measure other parameters than the diameter, wherein these other parameters include, for example, the non-roundness of a cable.

According to one preferred embodiment, the parallel partial wave fronts used for exposing the HOE according to the invention are all located in one plane. For the exposure, the angle between the reference wave front and the joint plane for the parallel partial wave fronts is preferably 40° to 50° and, in particular, approximately 45°, wherein the bisector of this angle in particular is positioned perpendicular on the plane of the holographic optical element.

According to another preferred embodiment, the HOE according to the invention comprises separate and/or spatially separated sections with respectively one interference pattern, wherein these interference patterns are different. In other words, the first section comprises the first interference pattern, the second section the second interference pattern and the third section comprises the third interference pattern and so forth.

The sections with the different interference patterns, however, can also spatially overlap on the HOE, at least in some regions, or can coincide completely. Thus, an HOE according to the invention can have a single section which comprises three superimposed interference patterns. In other words, the aforementioned section represents a super-imposition of three sections with separate interference patterns. Also possible are mixed forms where the aforementioned sections overlap only in part.

The HOE according to the invention can be a component of a device for detecting a dimension and/or position of an object, wherein this object can be a cable, a profile or a pipe leaving an extruder. A device of this type is known and normally comprises a transmitter part and a receiver part. A light beam is generated in the transmitter part, which is deflected such that it sweeps over a specific angular range. The HOE according to the invention in this case can be inserted into the transmitting part as well as the receiving part or into both, depending on the problem definition. Of course, these HOEs must be matched to each other. It is furthermore possible to install the HOE according to the invention in either the transmitter part or the receiver part and to use an HOE of the known type in the other part. An HOE of this type preferably is a holographic film plate.

The HOE according to the invention not only can be used in a device as described in the above, but for all purposes where wave fronts are generated as a result of diffraction on the HOE. However, the HOE according to the invention is preferably used for measuring the dimension and position of an object, in particular a cable or a pipe, with the aid of a deflected laser beam that sweeps over a specific angular range.

BRIEF DESCRIPTION OF THE DRAWINGS

The invention is explained in further detail in the following with the aid of Figures, which show in:

FIG. 1 A schematic view of the front of a known device according to EP-B 0 245 198 for determining the dimension and position of an object.

FIG. 2 A view from above of the known device shown in FIG. 1.

FIG. 3 A perspective basic view, showing the creation/exposure of an HOE according to the invention.

FIG. 4 A perspective view of the exposure of the HOE according to FIG. 3 with a deflected laser beam.

FIG. 5a A schematic view from above of a complete measuring system for measuring a cable with an HOE having three separate sections with respectively different interference patterns.

FIG. 5b A schematic view from the side of the system shown in FIG. 5a.

FIG. 6a A view from the top that approximately corresponds to FIG. 5a, wherein the regions with interference patterns of the HOE according to the invention are not spatially separated and/or arranged separately.

FIG. 6b A side view of FIG. 6a.

DETAILED DESCRIPTION OF THE INVENTION

Figures 5A, 5B:
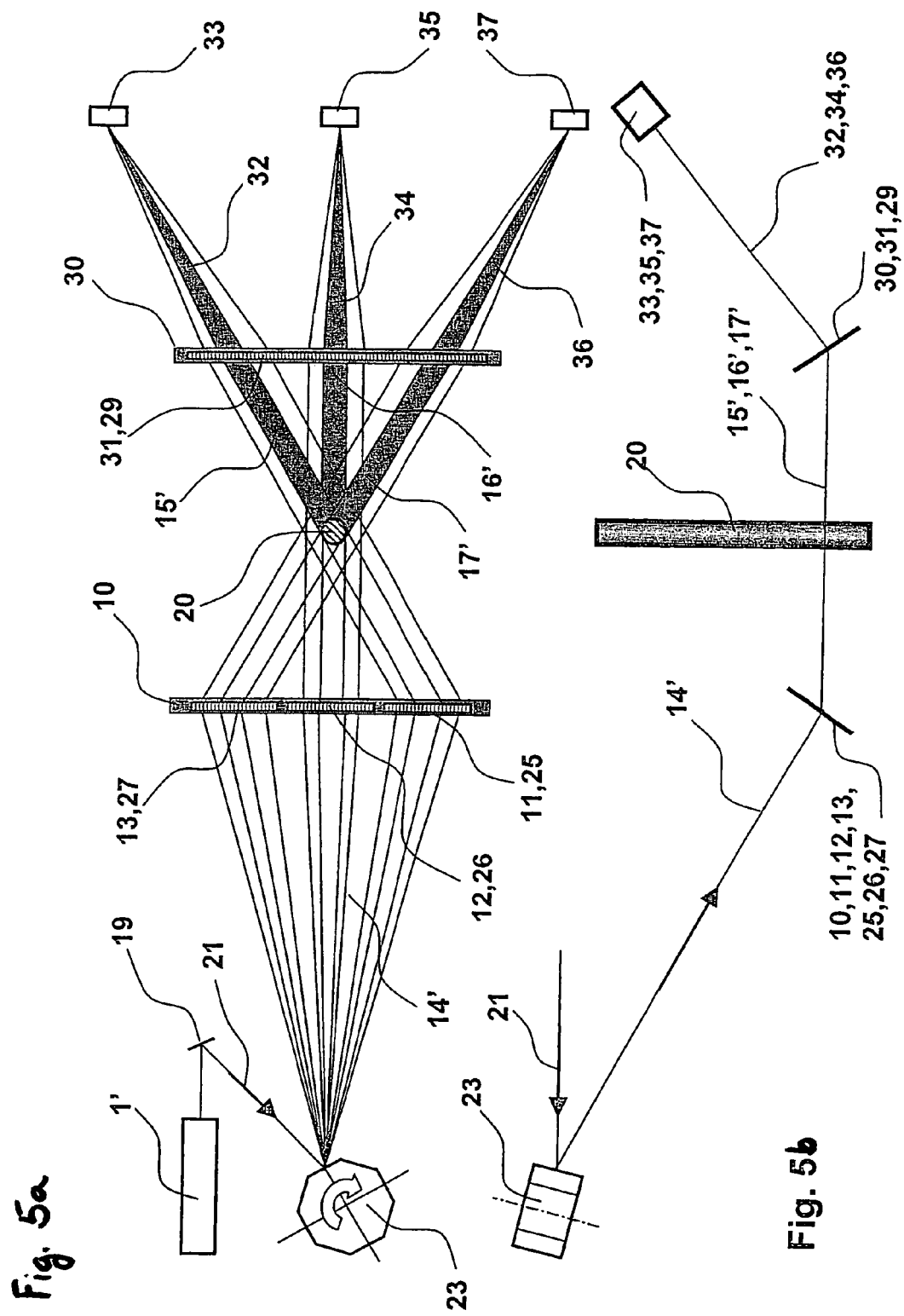

FIGS. 1 and 2 show a device for detecting a dimension and/or the position of an object S1, indicated with dash-dot line in these Figures, such as a cable or pipe leaving an extruder. Features known from prior art are otherwise provided with reference numbers having a capital S in front. For example, the FIGS. 1 and 2 are taken from European Patent Application No. EP-B10 245 198, wherein the reference numbers are supplemented with the aforementioned letter S. These two Figures are provided for an easier understanding of the options for using the HOE according to the invention.

The measuring device shown in FIG. 1 comprises a transmitting part S2, which is used to generate a telecentric light beam in the measuring range. A laser source S3 is provided which guides a continuous, monochromatic light beam over a mirror S4 to a spherical expansion optic S5 from which the expanded beam enters a cylindrical expansion optic S6. A flat light beam is thus generated for which the plane extends parallel to the longitudinal axis of the object to be measured. This is indicated in FIGS. 1 and 2 in that the light beam S7 has a very narrow width in the region of object S1 in the projection according to FIG. 1, but has a certain width in the projection according to FIG. 2. An expansion of this type, however, is not absolutely necessary. The desired dimension can also be detected with a non-expanded light beam.

The light beam S7 is then transmitted via additional deflection mirrors S8 and S9 onto an octagonal rotating mirror S10. When this mirror turns in a clockwise direction, the entering light beam is periodically deflected from the top toward the bottom over an angular range indicated in FIG. 1 with dashed lines. In the process, the beam hits a holographic optical element (HOE) S11. This HOE, which has a very thin optically effective layer and is located on an optically transparent carrier, is connected to a prism body S12 and is thus mechanically stabilized. A partial radiation share of the $0^{th}$ order $S7_0$ penetrates the HOE S11 without being diffracted and hits the front wall S13 of the transmitter S2 housing from the inside. However, the main share of the entering beam S7 is diffracted and leaves the HOE as beam of the $1^{st}$ order $S7_1$ under a specific angle. This beam is reflected on a totally reflecting or mirrored surface S14 of the prism body S12 and is projected through a window S15 into the measuring range. One or several optoelectronic converters S16 can be arranged at the point where the exiting beam of the $0^{th}$ order $S7_0$ impinges. On the opposite side of the measuring region, the beam $S7_1$ passes through a window S15 and enters the housing for a receiver S17, which contains a prism body S18 that is designed to correspond to the prism body S12 with an HOE S19 that corresponds to the HOE S11. The entering light beam is projected by the reflecting surface S20 of the prism body S18 onto the HOE S19, which always projects the beam onto an optoelectronic converter S21, for example a photoelectric cell.

With the periodic deflection of the telecentric beam around the deflection displacement, delimited by the dashed lines in FIG. 1, the beam travels to the converter S21 as long as it is not blanked out by the object S1. The dimension and the position of object S1 can be determined based on the duration of the fadeout and the starting and ending point of the fadeout. Additional instructions for calculating the required values can be found in the aforementioned European Patent Application No. EP-BL 0 245 198.

The HOE according to the invention is used to replace the HOE S12 shown in FIG. 1. Of course, the HOE according to the invention can also be used in differently configured devices of the same type.

The production and/or exposure of a first embodiment of an HOE according to the invention is shown in FIG. 3 in a perspective and schematic view that is not true to scale. A coherent wave front is generated with the laser and/or the laser light source 1. To obtain a fan-shaped wave front, the laser beam is focused with a lens 2 onto a pinhole mask 3. A point source is thus created, which determines the geometric source of the reference wave front 14.

The remaining wave fronts must be generated with the same laser beam to meet the coherence conditions. In the process, a first deflection occurs at the beam divider 4, which guides the deflected light beam onto the parabolic mirror 5. The wave front reflected there is on the whole "divided" into 3 parallel wave fronts by the beam dividers 6 and 7 that are arranged in the beam path of the wave front reflected by the parabolic mirror 5. These wave fronts consequently are parallel partial wave fronts.

The parallel partial wave front 16 in the center travels to a section 12 of the HOE 10 where it generates on the HOE 10 the necessary interference pattern and/or diffraction pattern 12' with the aid of the fan-shaped reference wave front 14. If the HOE 10 had only this one interference pattern 12', it would represent an HOE as described in the prior art.

As previously explained in the above, two partial wave fronts 16 and 17 are deflected from the wave front reflected by the parabolic mirror 5 with the aid of the beam dividers 6 and 7.

The two parallel partial wave fronts 15 and 17 on the side are beamed with the aid of deflection mirrors 8 and 9 into the HOE sections 11 and 13 on the side where they generate the corresponding interference patterns 11' and 13' together with the fan-shaped reference wave front 14. The optical length of all partial wave fronts 15, 16, 17 and the reference front 14 in this case must be the same. The holographic film plate 10 is thus exposed with the aid of the interference patterns, generated as explained in the above, and is subsequently developed.

The parallel partial wave fronts 15, 16 and 17 are selected and/or deflected to the HOE 10, such that when they are virtually extended through the HOE 10, they intersect behind this element 10 in the region/point 18 which is positioned in the center of the future measuring field 18 of the measuring device.

Otherwise, all three partial wave fronts 15, 16 and 17 are located in one plane. The angle enclosed between the reference wave front 14 and this plane is approximately 45°. The bisector of this angle is positioned perpendicular on the plane for the HOE 10 and is thus located in the paper plane for FIG. 3 if the HOE 10 is in this paper plane.

If a reference wave front 14 is beamed onto the HOE 10 that is completed as described in the above, parallel wave fronts 15', 16' and 17' that intersect in the measuring field 18 are generated as a result of diffraction on the interference patterns of the corresponding HOE sections 11, 12 and 13; as shown in FIG. 4. These wave fronts 15', 16' and 17' therefore extend in the direction and in the plane corresponding to the previously mentioned virtual extension of the partial wave fronts 15, 16, and 17 used for the exposure. The HOE 10 behaves in the same way as a fan-shaped wave front if a laser beam 21 is deflected fan-shaped by a rotating polygonal mirror 23 at the source 3 for the reference wave front 14. If the deflected beam 14' hits the sections 11, 12 and 13 of HOE 10, it is diffracted by the local, associated interference pattern 25, 26, 27 in such a way that it is deflected parallel to the side in the measuring field after it leaves the HOE 10. The diameter of a cable 20 can thus be determined from three different directions. The time during which the parallel laser beam coming from one measuring direction is interrupted therefore represents a measure for the respective diameter.

For the described HOE 10, the sections 11, 12 and 13 with the associated interference patterns 25, 26 and 27 are spatially separated. In other words, the HOE 10 has three separate and/or discrete sections 11, 12 and 13, wherein the measuring also occurs in three discrete axes.

FIG. 5a schematically shows a view from above of a complete measuring system, not true to scale, while FIG. 5b shows a view from the side. An HOE 10 according to FIG. 4 is integrated into the transmitting part of this measuring system. The arrangement of the polygonal mirror 23 etc. also corresponds to the one in FIG. 4, so that the same reference numbers are used for the same parts and/or elements. Additionally shown in FIG. 5a is a deflection mirror 19, which does not have a critical function.

However, HOE 10 is used only in the transmitting part, but not the receiving part. An HOE 30 is used there which comprises only one section 31 with only one interference pattern 29. This HOE 30 consequently only functions in the manner of a normal lens. If a parallel beam hits a lens, and in the present case the HOE 30 with the interference pattern 29, the parallel rays are focused in the focal point of the lens. This focal point normally lies on the optical axis if the parallel beam of rays also extends parallel to the optical axis. These conditions exist for the central measuring beam 16' and the following focusing beam path 34 up to the receiving element 35.

If the parallel beam is beamed at an angle into the HOE 30 and/or the lens, the focal point is also displaced to the side, meaning to the axis extending through the center of the lens or the HOE 30 and parallel to the beam of rays. These conditions exist with the two measuring beams 15' and 17' on the side, so that the focusing beams 32 and 36 correspondingly hit the receivers 33 and 37 in the displaced focal points.

Since the HOE 10 in FIG. 5a has three separate and discrete sections 11, 12 and 13, the cable 20 is also measured in three discrete axes and/or zones. With the view in FIG. 6a, which corresponds to the view in FIG. 5, the HOE 10 of FIG. 5 is replaced with an HOE 40. This HOE 40 does not contain separate sections and associated, separately arranged interference patterns. Rather, this HOE 40 only contains one section with one interference pattern 28, consisting of three different interference patterns 43, 44 and 45 that overlap. In order to create an HOE 40 of this type, the sections irradiated by the parallel wave fronts must overlap. The HOE 40 in that case optically behaves as if three different lens systems were nestled into each other, which is not possible with normal lenses.

The HOE 30 in the receiver part for the embodiment shown in FIG. 6a corresponds to the HOE 30 for the embodiment shown in FIG. 5a.

The elements and/or parts shown in FIGS. 6a and 6b are also given the same reference numbers or reference characters as in FIGS. 5a and 5b, but are additionally provided with one or two apostrophes (' or ").

The use of extremely flat measuring angles, additionally shown in FIG. 6a, has the advantage that with an irregular profile a possible maximum dimension can be clearly detected at the same time. The maximum can also be interpolated for higher requirements.

Figure 7:
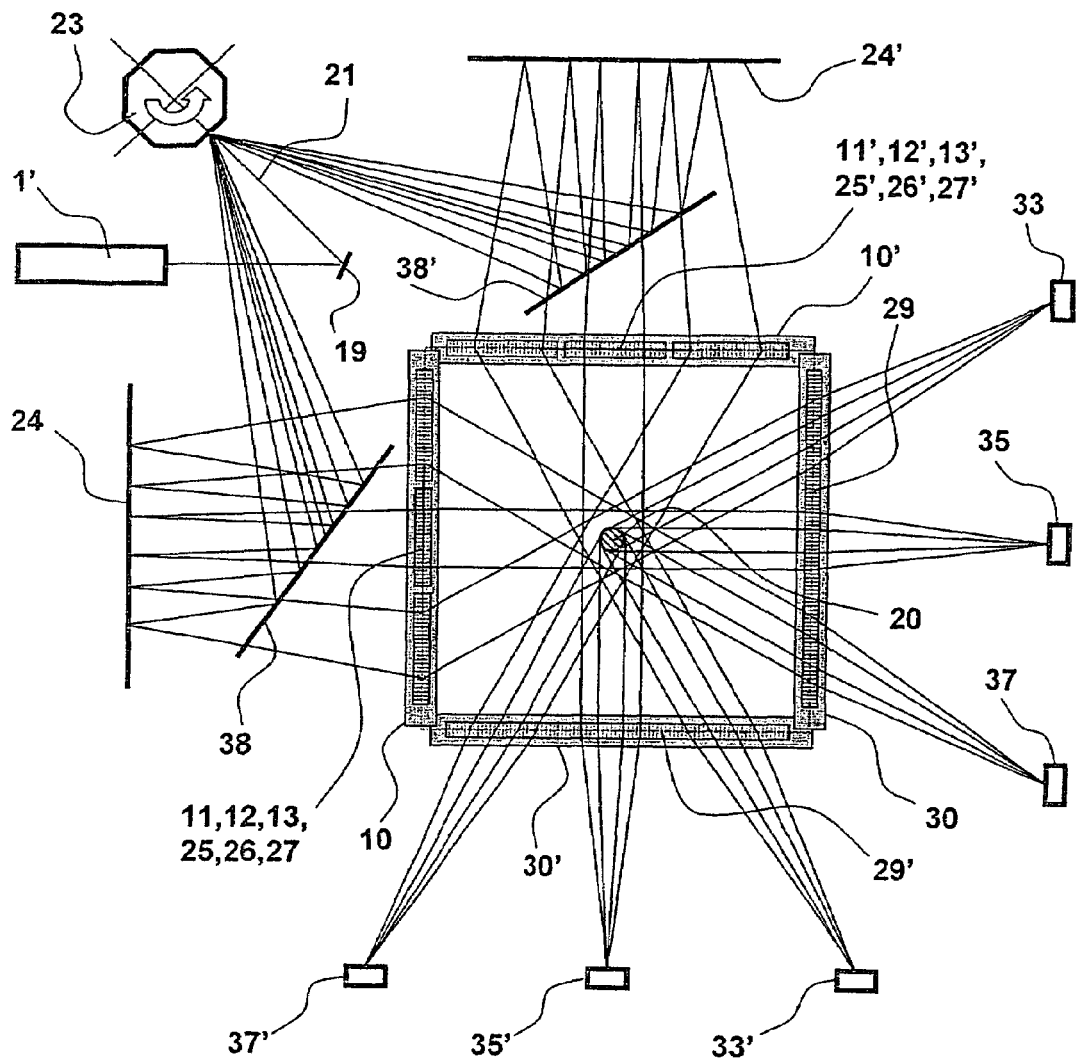
FIG. 7 A schematic view from the top of a measuring system where two HOEs according to the invention are used, which are arranged at an angle of approximately 90° to each other.

FIG. 7 contains an additional embodiment in a view from above, shown in a schematic representation that is not true to scale, wherein two HOEs 10, 10' are used which correspond to the HOE 10 for the embodiment shown in FIG. 5a. However, these two HOEs 10, 10' are arranged perpendicular to each other, so that the cable 20 can be measured from two main directions that are perpendicular to each other. For the embodiment shown in FIG. 7, the same elements and/or parts are also given the same reference numbers or reference characters and are provided additionally with one or two apostrophes (' or "). Additional deflection mirrors 24, 24', 38 and 38' are also provided for practical and economic reasons.

With this embodiment, the HOEs 10, 10' have separate sections 11, 12 and 13, and 11', 12' and 13', respectively, in the transmitting part and thus have separate interference patterns 25, 26 and 27, and 25', 26' and 27', respectively. The HOEs 30, 30', respectively have only one section and thus one interference pattern 29. With this embodiment, cable 20 measurements are possible for a total of 6 discrete directions and/or axes. In both HOE 10, 10' of the transmitter part, 2×3 separate sections are provided.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method of measuring a dimension and/or position of an object located in a measuring field, comprising:
   projecting a fan-shaped reference wave onto a holographic optical element located in font of the measuring field, the holographic optical element having a first interference pattern and a second interference pattern;
   forming with the first interference pattern a first parallel partial wave front from the fan-shaped reference wave, the first parallel partial wave front entering the measuring field and contacting the object;
   forming with the second interference pattern a second parallel partial wave front from the fan-shaped reference wave, the second parallel partial wave front entering the measuring field and contacting the object;
   receiving the first parallel partial wave front and the second parallel partial wave front with at least one optoelectronic converter located behind the measuring field; and
   determining the dimension and/or position of the object based on the first parallel partial wave front and the second parallel partial wave front received by the at least one optoelectronic converter.

2. The method of claim 1, wherein the first parallel partial wave front and the second parallel partial wave front intersect in a center point of the measuring field.

3. The method of claim 1, further comprising:
   generating a laser beam with a monochromatic and coherent light source; and
   deflecting the laser beam to form the fan-shaped reference wave.

4. The method of claim 1, wherein the first parallel partial wave front and the second parallel partial wave front are located in a common plane.

5. The method of claim 4, wherein the fan-shaped reference wave is located in a second plane, and the second plane is angled with respect to the common plane by an angle of between 40° and 50°.

6. The method of claim 1, wherein:
   forming the first parallel partial wave front comprises deflecting the first parallel partial wave front at an angle with respect to the fan-shaped reference wave; and
   forming the second parallel partial wave front comprises deflecting the second parallel partial wave front at an angle with respect to the fan-shaped reference wave.

7. The method of claim 1, further comprising:
   forming a third parallel partial wave front from the fan-shaped reference wave using a third interference pattern located on the holographic optical element, the third parallel partial wave front entering the measuring field;
   wherein the third parallel partial wave front intersects the first parallel partial wave front and the second parallel partial wave front in the measuring field.

8. The method of claim 1, further comprising:
   measuring an amount of time the first parallel partial wave front is interrupted by the object; and
   measuring an amount of time the second parallel partial wave front is interrupted by the object.

9. The method of claim 1, further comprising:
   deflecting the first parallel partial wave front onto the at least one receiver using a first additional interference pattern located on a second holographic optical element; and
   deflecting the second parallel partial wave front onto the at least one receiver using a second additional interference pattern located on the second holographic optical element.

10. The method of claim 1, wherein the first interference pattern and the second interference pattern are completely spaced apart from one another.

11. The method of claim 1, wherein the first interference pattern at least partially overlaps the second interference pattern.

12. The method of claim 1, wherein the holographic optical element comprises a holographic film plate.

13. The method of claim 1, wherein the object comprises a cable, a profile, or a pipe.

14. A method of making a measuring device for measuring a dimension and/or position of an object, comprising:
   making a holographic optical element, comprising:
      generating a fan-shaped reference wave using a monochromatic and coherent laser light source and projecting the fan-shaped reference wave onto the holographic optical element;
      generating a first parallel partial wave front from the monochromatic and coherent laser light source and projecting the first parallel partial wave front onto the holographic optical element at a different angle than the fan-shaped reference wave to form a first interference pattern on the holographic optical element; and
      generating a second parallel partial wave front from the monochromatic and coherent laser light source and projecting the second parallel partial wave front onto the holographic optical element at a different angle than the fan-shaped reference wave to form a second interference pattern on the holographic optical element;
      wherein virtual extensions of the first parallel partial wave front and the second parallel partial wave front intersect one another at an intersection point;
   providing a laser light source in the measuring device in front of the holographic optical element, the laser light source positioned to project a fan-shaped reference wave onto the first interference pattern and the second interference pattern; and
   providing at least one optoelectronic converter in the measuring device behind the holographic optical element, the at least one optoelectronic converter positioned to receive at least some of the light transmitted by the first interference pattern and the second interference pattern.

15. The method of claim 14, wherein:
   generating the first parallel partial wave front comprises projecting the fan-shaped reference wave onto a first beam splitter; and
   generating the second parallel partial wave front comprises projecting the fan-shaped reference wave onto a second beam splitter.

16. The method of claim 14, further comprising:
generating a third parallel partial wave front from the monochromatic and coherent laser light source and projecting the third parallel partial wave front onto the holographic optical element at a different angle than the fan-shaped reference wave to form a third interference pattern on the holographic optical element;
wherein virtual extensions of the first parallel partial wave front, the second parallel partial wave front, and the third parallel partial wave front intersect one another at the intersection point.

17. The method of claim 14, wherein the first parallel partial wave front and the second parallel partial wave front are located in a common plane.

18. The method of claim 14, wherein the holographic optical element comprises a holographic film plate.

19. The method of claim 14, wherein the first interference pattern and the second interference pattern are completely spaced apart from one another.

20. The method of claim 14, wherein the first interference pattern at least partially overlaps the second interference pattern.

21. A measuring apparatus made according to the method of claim 14.

* * * * *